United States Patent
Dai et al.

(10) Patent No.: US 9,472,021 B2
(45) Date of Patent: Oct. 18, 2016

(54) METHOD AND SYSTEM FOR THREE-DIMENSIONALLY RECONSTRUCTING NON-RIGID BODY BASED ON MULTI-DEPTH-MAP

(71) Applicant: Tsinghua University, Beijing (CN)

(72) Inventors: Qionghai Dai, Beijing (CN); Genzhi Ye, Beijing (CN); Yebin Liu, Beijing (CN)

(73) Assignee: Tsinghua University, Beijing (CN)

( * ) Notice: Subject to any disclaimer, the term of this patent is extended or adjusted under 35 U.S.C. 154(b) by 252 days.

(21) Appl. No.: 14/261,807

(22) Filed: Apr. 25, 2014

(65) Prior Publication Data

US 2014/0320491 A1 Oct. 30, 2014

(30) Foreign Application Priority Data

Apr. 26, 2013 (CN) .......................... 2013 1 0150796

(51) Int. Cl.
*G06T 15/00* (2011.01)
*G06T 17/00* (2006.01)
*G06T 7/00* (2006.01)

(52) U.S. Cl.
CPC ............. *G06T 17/00* (2013.01); *G06T 7/0065* (2013.01); *G06T 7/0071* (2013.01); *G06T 2207/10028* (2013.01)

(58) Field of Classification Search
CPC .......... G06T 2207/10028; G06T 2207/20048; G06T 17/00; G06T 7/0065; G06T 7/0022; G06T 7/0024; G06T 7/0036
USPC ................................................ 345/419, 427
See application file for complete search history.

(56) References Cited

U.S. PATENT DOCUMENTS

| | | | | | |
|---|---|---|---|---|---|
| 2003/0235344 A1* | 12/2003 | Kang | ....................... | G06K 9/32 | 382/284 |
| 2011/0286530 A1* | 11/2011 | Tian | ................... | H04N 21/2365 | 375/240.25 |

OTHER PUBLICATIONS

Chi Kin Chow, Shiu Yin Yuen, "Recovering Shape by Shading and Stereo Under Lambertian Shading Model", International Journal of Computer Vision, Oct. 2009, vol. 85, Issue 1, p. 58-100.*
David Peter Capel (Image Mosaicing and Super-resolution, 2001, retrieved from https://www.robots.ox.ac.uk/~vgg/publications/2001/Capel01a/capel01a.pdf.*
James D. Foley et al, Computer Graphics: Principles and Practice, 2nd Edition in C, 1997, ISBN0-201-84840-6.*

\* cited by examiner

*Primary Examiner* — Weiming He
(74) *Attorney, Agent, or Firm* — Lathrop & Gage LLP

(57) ABSTRACT

A method and a system for three-dimensionally reconstructing a non-rigid body based on a multi-depth-map are provided. The method comprises: obtaining a plurality of depth maps by shooting the non-rigid body in different postures and from different angles; transforming each depth map to one group of three-dimensional point clouds and obtaining a plurality of matching point pairs among a plurality of groups of three-dimensional point clouds; conducting a position transformation for each matching point and obtaining a transformation parameter corresponding to the each matching point after the position transformation; mosaicing all transformation parameters to obtain a mosaicing result and constructing an energy function according to the mosaicing result; and solving the energy function to obtain a solution result and reconstructing a three-dimensional model of the non-rigid body according to the solution result.

14 Claims, 2 Drawing Sheets

US 9,472,021 B2

METHOD AND SYSTEM FOR THREE-DIMENSIONALLY RECONSTRUCTING NON-RIGID BODY BASED ON MULTI-DEPTH-MAP

RELATED APPLICATIONS

This application claims the benefit of priority of Chinese Application No. 201310150796.4 filed Apr. 26, 2013.

FIELD

The present disclosure relates to a computer vision field, and more particularly relates to a method and a system for three-dimensionally reconstructing a non-rigid body based on a multi-depth-map.

BACKGROUND

A three-dimensional reconstruction is a key issue in a computer vision field. A high-quality three-dimensional model has important applications in fields like entertainments, protection of historical relics and machining. However, the high-quality three-dimensional model is usually obtained by using an expensive laser scanner, which ensures an accuracy but has two defects: first, a scanned object is required to be absolutely static during a scanning process, because any slight movement may lead to an obvious error of a scanning result; and second, the laser scanner is too highly priced to popularize.

SUMMARY

The present disclosure seeks to solve at least one of the above problems.

According to a first aspect of the present disclosure, a method for three-dimensionally reconstructing a non-rigid body based on the multi-depth-map is provided. The method comprises: obtaining a plurality of depth maps by shooting the non-rigid body in different postures and from different angles; transforming each depth map to one group of three-dimensional point clouds and obtaining a plurality of matching point pairs among a plurality of groups of three-dimensional point clouds; conducting a position transformation for each matching point and obtaining a transformation parameter corresponding to the each matching point after the position transformation; mosaicing all transformation parameters to obtain a mosaicing result and constructing an energy function according to the mosaicing result; and solving the energy function to obtain a solution result and reconstructing a three-dimensional model of the non-rigid body according to the solution result.

In one embodiment, the plurality of depth maps are obtained by using a depth camera to shoot the non-rigid body.

In one embodiment, the method further comprises acquiring an intrinsic matrix of the depth camera.

In one embodiment, the each depth map is transformed to the one group of three-dimensional point clouds according to the intrinsic matrix.

In one embodiment, the each depth map is transformed to the one group of three-dimensional point clouds by a transformation formula: $P_c^i = K^{-1}(u, v, d_c(u, v))^T$, where u,v are pixel coordinates, $d_c(u,v)$ is a depth value of the pixel (u,v) on a $c^{th}$ depth map, and K is the intrinsic matrix.

In one embodiment, conducting a position transformation for each matching point and obtaining a transformation parameter corresponding to the each matching point after the position transformation comprises: calculating a rotation matrix and an offset vector of the each matching point; obtaining a position transformation equation of the each matching point according to the rotation matrix and the offset vector; and obtaining the transformation parameter corresponding to the each matching point according to the position transformation equation.

In one embodiment, the position transformation equation is: p'=Rp+t, where p is the matching point, R is the rotation matrix and t is the offset vector.

In one embodiment, the energy function is: $X = \mathrm{argmin}_X \alpha_e E_e + \alpha_f E_f + \alpha_n E_n$, where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively.

In one embodiment, the energy function is solved by a linear least square method.

With the method for three-dimensionally reconstructing the non-rigid body based on the multi-depth-map according to embodiments of the present disclosure, a plurality of depth maps are obtained by using the depth camera to shoot the non-rigid body in different postures and from different angles, and a three-dimensional modeling for the non-rigid body is achieved based on the plurality of depth maps. Input information required by the method is easy to collect and a complete high-accuracy three-dimensional model may be obtained. Furthermore, the method is accurate and robust in solving and may eliminate influences resulting from an error accumulation. In addition, the method is simple and fast to operate, and thus it has a broad application prospect and may be applied by a hardware system such as a common PC (personal computer) or a workstation.

According to a second aspect of the present disclosure, a system for three-dimensionally reconstructing a non-rigid body based on a multi-depth-map is provided. The system comprises: a depth camera, configured for obtaining a plurality of depth maps by shooting the non-rigid body in different postures and from different angles; a matching module, configured for transforming each depth map to one group of three-dimensional point clouds and obtaining a plurality of matching point pairs among a plurality of groups of three-dimensional point clouds; a transforming module, configured for conducting a position transformation for each matching point and obtaining a transformation parameter corresponding to the each matching point after the position transformation; a mosaicing module, configured for mosaicing all the transformation parameters to obtain a mosaicing result and constructing an energy function according to the mosaicing result; and a three-dimensional reconstructing module, configured for solving the energy function to obtain a solution result and reconstructing a three-dimensional model of the non-rigid body according to the solution result.

In one embodiment, the system further comprises an acquiring module configured for acquiring an intrinsic matrix of the depth camera.

In one embodiment, the matching module comprises: a transforming unit configured for transforming the each depth map to the one group of three-dimensional point clouds according to the intrinsic matrix; and a first obtaining unit configured for obtaining the plurality of matching point pairs among the plurality of groups of three-dimensional point clouds.

In one embodiment, the each depth map is transformed to the group of three-dimensional point clouds by a transformation formula: $P_c^i = K^{-1}(u, v, d_c(u, v))^T$, where u,v are pixel coordinates, $d_c(u,v)$ is a depth value of the pixel (u,v) on a $c^{th}$ depth map, and K is the intrinsic matrix.

In one embodiment, the transforming module comprises: a calculating unit configured for calculating a rotation matrix and an offset vector of the each matching point; a second obtaining unit configured for obtaining a position transformation equation of the each matching point according to the rotation matrix and the offset vector; and a third obtaining unit configured for obtaining the transformation parameter corresponding to the each matching point according to the position transformation equation.

In one embodiment, the position transformation equation is: p'=Rp+t, where p is the matching point, R is the rotation matrix and t is the offset vector.

In one embodiment, the energy function is: $X=\mathrm{argmin}_X \alpha_e E_e + \alpha_f E_f + \alpha_n E_n$, where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively.

In one embodiment, the energy function is solved by a linear least square method.

With the system for three-dimensionally reconstructing the non-rigid body based on the multi-depth-map according to embodiments of the present disclosure, a plurality of depth maps are obtained by using the depth camera to shoot the non-rigid body in different postures and from different angles, and a three-dimensional modeling for the non-rigid body is achieved based on the plurality of depth maps. Input information required by the system is easy to collect and a complete high-accuracy three-dimensional model may be obtained. Furthermore, the system is accurate and robust in solving and may eliminate influences resulting from an error accumulation. In addition, the system is low in cost and fast in operation, and thus it has a broad application prospect and may be realized by a hardware system such as a common PC or a workstation.

Additional aspects and advantages of the present disclosure are given in the description below and part of the additional aspects and advantages will become apparent from the description below or become appreciated through the practice of the present disclosure.

BRIEF DESCRIPTION OF THE DRAWINGS

These and other aspects and advantages of embodiments of the present disclosure will become apparent and more readily appreciated from the following descriptions made in conjunction with the accompanying drawings, in which.

DETAILED DESCRIPTION

Figure 1:
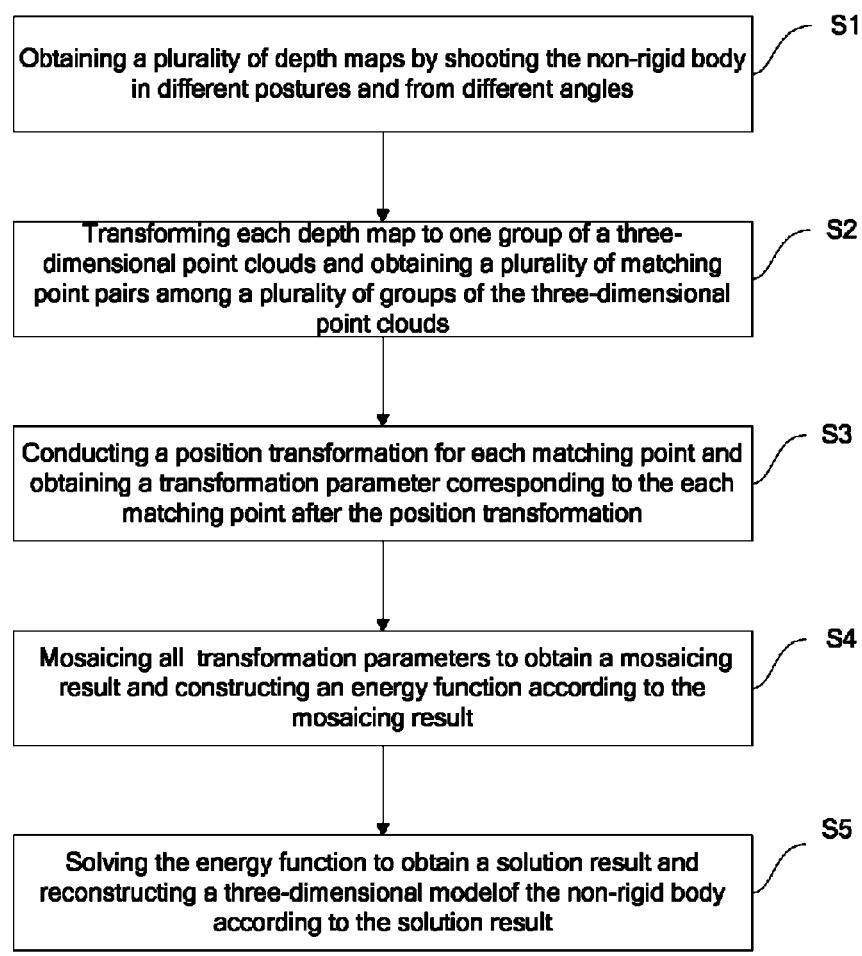
FIG. 1 is a flow chart of a method for three-dimensionally reconstructing a non-rigid body based on a multi-depth-map according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the specification, terms concerning attachments, coupling and the like, such as "connected" and "interconnected", refer to a relationship in which structures are secured or attached to one another either directly or indirectly through intervening structures, as well as both movable or rigid attachments or relationships, unless expressly described otherwise. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A method and a system for three-dimensionally reconstructing a non-rigid body based on a multi-depth-map according to embodiments of the present disclosure are described in conjunction with the accompanying drawings.

FIG. 1 is a flow chart of the method for three-dimensionally reconstructing the non-rigid body based on the multi-depth-map according to an embodiment of the present disclosure. As shown in FIG. 1, the method comprises the following steps.

At step S1, a plurality of depth maps are obtained by shooting the non-rigid body in different postures and from different angles.

Specifically, the plurality of depth maps may be obtained by using a depth camera to shoot the non-rigid body, that is, the plurality of depth maps may be collected by using the depth camera to shoot a same non-rigid object in different postures and from different angles.

At step S2, each depth map is transformed to one group of three-dimensional point clouds and a plurality of matching point pairs are obtained among a plurality of groups of three-dimensional point clouds.

In one embodiment of the present disclosure, the method further comprises acquiring an intrinsic matrix of the depth camera. Thus, the each depth map is transformed to the one group of three-dimensional point clouds according to the intrinsic matrix by a transformation formula: $P_c^i = K^{-1}(u, v, d_c(u, v))^T$, where u, v are pixel coordinates, $d_c(u,v)$ is a depth value of the pixel (u,v) on a $c^{th}$ depth map, and K is the intrinsic matrix.

To be specific, for example: if there are $N_f$ depth maps, the $N_f$ depth maps $d_c(u, v)$ are input, where c=1, 2, . . . , $N_f$. Then for a given intrinsic matrix, the each depth map may be transformed to the one group of three-dimensional point clouds by using the above formula.

At the beginning, a correspondence relationship (i.e., a matching point pair) of feature points among the groups of the three-dimensional point clouds is specified manually by a user. Because there are fewer feature points but there are many regions with a same geometric distribution, it is hard to realize the match by using a full-automatic matching algorithm. Thus, an accurate high-quality three-dimensional reconstruction effect may be realized by only manually specifying the correspondence relationships of a few feature points. In one embodiment, a corresponding point pair set is expressed as $F=\{f_i | f_i = (p_c^m, p_{c'}^{m'})\}$, which represents that an $m^{th}$ point of a $c^{th}$ frame is corresponding to (i.e., matched with) an $m'^{th}$ point of a $c'^{th}$ frame.

At step S3, a position transformation is conducted for each matching point and a transformation parameter corresponding to the each matching point after the position transformation is obtained.

In a specific example, conducting position transformation for each matching point and obtaining a transformation parameter corresponding to the each matching point after the position transformation may comprise the following steps.

At step S31, a rotation matrix and an offset vector of the each matching point are calculated.

At step S32, a position transformation equation of the each matching point is obtained according to the rotation matrix and the offset vector, in which the position transformation equation is: p'=Rp+t, where p is the matching point, R is the rotation matrix and t is the offset vector.

At step S33, the transformation parameter corresponding to the each matching point is obtained according to the position transformation equation.

That is, after the above corresponding points (matching point pairs) are specified, respective frame of point cloud starts to be mosaiced in a full-automatic manner. In this embodiment of the present disclosure, the transformation parameters of all frames of point clouds may be jointly solved by an overall joint transformation mosaicing method, which avoids an error accumulation resulting from aligning frame by frame.

To be specific, the rotation matrix R and the offset vector t are solved for each point p in the point cloud, then a transformed position for the point p is expressed as: p'=Rp+t. Further, in order to realize a fast linear solution, an approximation is conducted as follows for the position transformation equation by using an exponential mapping method:

$$p' = Rp + t \approx (I + \hat{\xi})\hat{p},$$

where I is a four-dimensional unit matrix, $\hat{p}$ is a homogeneous coordinate of p and $$\hat{\xi} = \begin{bmatrix} 0 & -w_z & w_y & v_1 \\ w_z & 0 & -w_x & v_2 \\ -w_y & w_x & 0 & v_3 \\ 0 & 0 & 0 & 1 \end{bmatrix},$$

and then
$(I+\hat{\xi})\hat{p}$ is transformed as follows:

$$(I+\hat{\xi})\hat{p} = \begin{bmatrix} 1 & -w_z & w_y & v_1 \\ w_z & 1 & -w_x & v_2 \\ -w_y & w_x & 1 & v_3 \\ 0 & 0 & 0 & 1 \end{bmatrix} \begin{pmatrix} p_x \\ p_y \\ p_z \end{pmatrix}$$

$$= \begin{bmatrix} 1 & 0 & 0 & 0 & p_z & -p_y \\ 0 & 1 & 0 & -p_z & 0 & p_x \\ 0 & 0 & 1 & p_y & -p_x & 0 \end{bmatrix} \begin{pmatrix} v_1 \\ v_2 \\ v_3 \\ w_x \\ w_y \\ w_z \end{pmatrix}.$$

For the each point, an unknown parameter to be solved is a six-dimensional transformation parameter $x=(v_1, v_2, v_3, w_x, w_y, w_z)^T$.

At step S4, all the transformation parameters are mosaiced to obtain a mosaicing result and an energy function is constructed according to the mosaicing result, in which the energy function is: $X=\text{argmin}_X \alpha_e E_e + \alpha_f E_f + \alpha_n E_n$, where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively.

Specifically, transformation parameters x of all the points are mosaiced to form an X. X is a solution that may enable the energy function $X=\text{argmin}_X \alpha_e E_e + \alpha_f E_f + \alpha_n E_n$ to reach a minimum.

In one embodiment, $E_e = \Sigma_{c=1}^{N_f} \Sigma_{i=1}^{N_c} \Sigma_{j \in N(i)} \|x_i - x_j\|^2$. The topology constraint $E_e$ guarantees that a transformation parameter $x_i$ of each point $p_i$ in the point cloud of each frame is as close as possible to a transformation parameter $x_j$ of a neighboring point $p_j$ of the each point $p_i$, thus keeping an original topology for the point cloud.

In one embodiment, $E_f = \Sigma_{i,j \in F} \|x_i(p_i) - x_j(p_j)\|^2$. The feature constraint $E_f$ guarantees that a position of the point $p_i$ after a position transformation is as close as possible to a position of the point $p_j$ after a position transformation, $x_i(p_i)$ represents a target position of the point $p_i$ after a transformation $x_i$, and $x_j(p_j)$ represents a target position of the point $p_j$ after a transformation $x_j$.

In one embodiment, $E_n = \Sigma_{c=1}^{N_f} \Sigma_{i=1}^{N_c} \|x_i(p_i) - x_{nn(i)}(p_{nn(i)})\|^2$. The nearest point constraint $E_n$ guarantees a fine alignment of the point clouds. Specifically, it is required that for each point $p_i$ in the point cloud seeks a point $p_{nn(i)}$ in other frames of point clouds nearest to the point $p_i$, and a target position $x_i(p_i)$ of the point $p_i$ after the transformation $x_i$ is as close as possible to a target position $x_{nn(i)}(p_{nn(i)})$ of the point $p_{nn(i)}$ after the transformation $x_{nn(i)}$.

At step S5, the energy function is solved to obtain a solution result and a three-dimensional model of the non-rigid body is reconstructed according to the solution result.

In one embodiment, the energy function may be solved quickly and efficiently by using a linear least square method. The position of each point is updated according to the solution result. As it is provided that a nearest point is a corresponding point in the nearest point constraint, only by multiple iterative solutions, an ultimate correct position may be reached.

With the method for three-dimensionally reconstructing the non-rigid body based on the multi-depth-map according to embodiments of the present disclosure, a plurality of depth maps are obtained by using the depth camera to shoot the non-rigid body in different postures and from different angles, and a three-dimensional modeling for the non-rigid body is achieved based on the plurality of depth maps. Input information required by the method is easy to collect and a complete high-accuracy three-dimensional model may be obtained. Furthermore, the method is accurate and robust in solving and may eliminate influences resulting from an error accumulation. In addition, the method is simple and fast to operate, and thus it has a broad application prospect and may be applied by a hardware system such as a common PC (personal computer) or a workstation.

In addition, with the method according to embodiments of the present disclosure, the depth camera is used to scan the body (e.g., object) in different postures and from different angles to obtain the depth maps, and the transformation, the mosaicing and the alignment of the point clouds may be realized by the algorithm in a full-automatic manner. Compared with a conventional method for three-dimensionally reconstructing the non-rigid body using the depth camera, the greatest advantage of the method according to embodiments of the present disclosure is that it may be applicable to a dynamic human body scanning or a general non-rigid body scanning.

Figure 2:
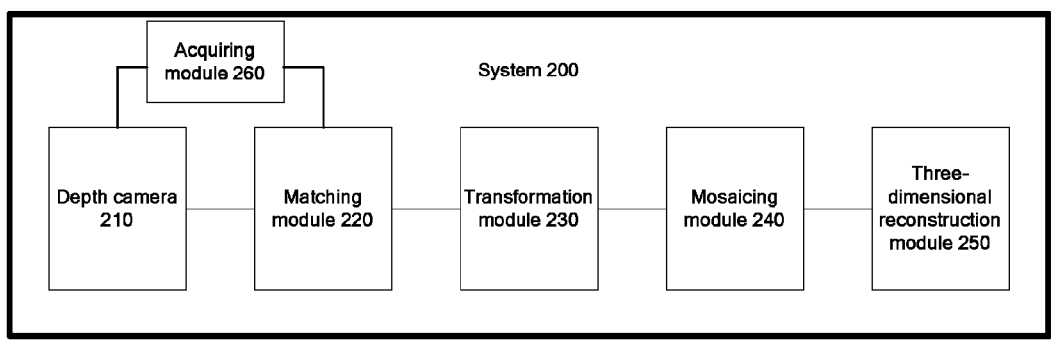
FIG. 2 is block diagram of a system for three-dimensionally reconstructing a non-rigid body based on a multi-depth-map according to an embodiment of the present disclosure.

A system for three-dimensionally reconstructing a non-rigid body based on a multi-depth-map is further provided. FIG. 2 is a block diagram of the system for three-dimensionally reconstructing the non-rigid body based on the multi-depth-map according to an embodiment of the present disclosure. As shown in FIG. 2, the system 200 comprises: a depth camera 210, a matching module 220, a transforming module 230, a mosaicing module 240, and a three-dimensional reconstructing module 250.

The depth camera 210 is configured for obtaining a plurality of depth maps by shooting the non-rigid body in different postures and from different angles. The matching module 220 is configured for transforming each depth map to one group of a three-dimensional point clouds and obtaining a plurality of matching point pairs among a plurality of groups of the three-dimensional point clouds. The transforming module 230 is configured for conducting a position transformation for each matching point and obtaining a transformation parameter corresponding to the each matching point after the position transformation. The mosaicing module 240 is configured for mosaicing all the transformation parameters to obtain a mosaicing result and constructing an energy function according to the mosaicing result. The three-dimensional reconstructing module 250 is configured for solving the energy function to obtain a solution result and reconstructing a three-dimensional model of the non-rigid body according to the solution result.

In one embodiment, the system 200 further comprises an acquiring module 260 configured for acquiring an intrinsic matrix of the depth camera.

In one embodiment, the matching module 220 comprises: a transforming unit configured for transforming the each depth map to the one group of three-dimensional point clouds according to the intrinsic matrix; and a first obtaining unit configured for obtaining the plurality of matching point pairs among the plurality of groups of three-dimensional point clouds.

In one embodiment, the each depth map is transformed to the group of three-dimensional point clouds by a transformation formula: $p_c^i = K^{-1}(u, v, d_c(u, v))^T$, where u, v are pixel coordinates, $d_c(u, v)$ is a depth value of the pixel (u, v) on a $c^{th}$ depth map, and K is the intrinsic matrix.

In one embodiment, the transforming module comprises: a calculating unit configured for calculating a rotation matrix and an offset vector of the each matching point; a second obtaining unit configured for obtaining a position transformation equation of the each matching point according to the rotation matrix and the offset vector; and a third obtaining unit configured for obtaining the transformation parameter corresponding to the each matching point according to the position transformation equation.

In one embodiment, the position transformation equation is: $p' = Rp + t$, where p is the matching point, R is the rotation matrix and t is the offset vector In one embodiment, the energy function is: $X = \mathrm{argmin}_X \alpha_e E_e + \alpha_f E_f + \alpha_n E_n$, where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively.

In one embodiment, the energy function is solved by a linear least square method.

With the system for three-dimensionally reconstructing the non-rigid body based on the plurality of depth maps according to embodiments of the present disclosure, a plurality of depth maps are obtained by using the depth camera to shoot the non-rigid body in different postures and from different angles, and a three-dimensional modeling for the non-rigid body is achieved based on the plurality of depth maps. Input information required by the system is easy to collect and a complete high-accuracy three-dimensional model may be obtained. Furthermore, the system is accurate and robust in solving and may eliminate influences resulting from an error accumulation. In addition, the system is low in cost and fast in operation, and thus it has a broad application prospect and may be realized by a hardware system such as a common PC or a workstation.

In addition, with the system according to embodiments of the present disclosure, the depth camera is used to scan the body (e.g., object) in different postures and from different angles to obtain the depth maps, and the transformation, the mosaicing and the alignment of the point clouds may be realized by the algorithm in a full-automatic manner. Compared with a conventional system for three-dimensionally reconstructing the non-rigid body using the depth camera, the greatest advantage of the system according to embodiments of the present disclosure is that it may be applicable to a dynamic human body scanning or a general non-rigid body scanning.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for three-dimensionally reconstructing a non-rigid body based on a multi-depth-map, comprising:
   obtaining, by a depth camera, a plurality of depth maps by shooting the non-rigid body in different postures and from different angles;
   transforming, by a processor, each depth map to one group of three-dimensional point clouds and obtaining a plurality of matching point pairs among a plurality of groups of three-dimensional point clouds;
   conducting, by the processor, a position transformation for each matching point and obtaining a transformation parameter corresponding to the each matching point after the position transformation;
   mosaicing, by the processor, all transformation parameters to obtain a mosaicing result and constructing an energy function according to the mosaicing result, wherein the energy function is:

$$X = \mathrm{argmin}_X \alpha_e E_e + \alpha_f E_f + \alpha_n E_n$$

where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively; and solving, by the processor, the energy function to obtain a solution result and reconstructing a three-dimensional model of the non-rigid body according to the solution result.

2. The method according to claim 1, further comprising acquiring, by the processor, an intrinsic matrix of the depth camera.

3. The method according to claim 2, wherein the each depth map is transformed to the one group of three-dimensional point clouds according to the intrinsic matrix.

4. The method according to claim 3, wherein the each depth map is transformed to the one group of three-dimensional point clouds by a transformation formula:

$$P_c^i = K^{-1}(u, v, d_c(u,v))^T$$

where u, v are pixel coordinates, $d_c(u, v)$ is a depth value of the pixel (u, v) on a $c^{th}$ depth map, and K is the intrinsic matrix.

5. The method according to claim 1, wherein conducting, by the processor, a position transformation for each matching point and obtaining a transformation parameter corresponding to the each matching point after the position transformation comprises:
  calculating, by the processor, a rotation matrix and an offset vector of the each matching point;
  obtaining, by the processor, a position transformation equation of the each matching point according to the rotation matrix and the offset vector; and
  obtaining, by the processor, the transformation parameter corresponding to the each matching point according to the position transformation equation.

6. The method according to claim 5, wherein the position transformation equation is:

$$p' = Rp + t$$

where p is the matching point, R is the rotation matrix and t is the offset vector.

7. The method according to claim 1, wherein the energy function is solved by a linear least square method.

8. A system for three-dimensionally reconstructing a non-rigid body based on a multi-depth-map, comprising:
  a depth camera, configured for obtaining a plurality of depth maps by shooting the non-rigid body in different postures and from different angles;
  a processor; and
  a memory for storing instructions executable by the processor;
  wherein the processor is configured to:
  transform each depth map to one group of three-dimensional point clouds and obtaining a plurality of matching point pairs among a plurality of groups of three-dimensional point clouds;
  conduct a position transformation for each matching point and obtaining a transformation parameter corresponding to the each matching point after the position transformation;
  mosaic all transformation parameters to obtain a mosaicing result and constructing an energy function according to the mosaicing result, wherein the energy function is:

$$X = \operatorname*{argmin}_{X} \alpha_e E_e + \alpha_f E_f + \alpha_n E_n$$

where $E_e$ is a topology constraint, $E_f$ is a feature constraint, $E_n$ is a nearest point constraint, and $\alpha_e$, $\alpha_f$ and $\alpha_n$ are weighting coefficients of $E_e$, $E_f$ and $E_n$ respectively; and
  solve the energy function to obtain a solution result and reconstructing a three-dimensional model of the non-rigid body according to the solution result.

9. The system according to claim 8, wherein the processor is further configured to acquire an intrinsic matrix of the depth camera.

10. The system according to claim 9, wherein the processor is configured to transform each depth map to one group of three-dimensional point clouds and obtaining a plurality of matching point pairs among a plurality of groups of three-dimensional point clouds by steps of:
  transforming the each depth map to the one group of three-dimensional point clouds according to the intrinsic matrix; and
  obtaining the plurality of matching point pairs among the plurality of groups of three-dimensional point clouds.

11. The system according to claim 10, wherein the each depth map is transformed to the one group of three-dimensional point clouds by a transformation formula:

$$P_c^i = K^{-1}(u, v, d_c(u,v))^T$$

where u, v are pixel coordinates, $d_c(u, v)$ is a depth value of the pixel (u, v) on a $c^{th}$ depth map, and K is the intrinsic matrix.

12. The system according to claim 8, wherein the processor is configured to conduct a position transformation for each matching point and obtaining a transformation parameter corresponding to the each matching point after the position transformation by steps of:
  calculating a rotation matrix and an offset vector of the each matching point;
  obtaining a position transformation equation of the each matching point according to the rotation matrix and the offset vector; and
  obtaining the transformation parameter corresponding to the each matching point according to the position transformation equation.

13. The system according to claim 12, wherein the position transformation equation is:

$$p' = Rp + t$$

where p is the matching point, R is the rotation matrix and t is the offset vector.

14. The system according to claim 8, wherein the energy function is solved by a linear least square method.

* * * * *